(12) United States Patent
Wen et al.

(10) Patent No.: US 7,333,431 B2
(45) Date of Patent: Feb. 19, 2008

(54) METHOD FOR ACCELERATING TCP FLOWS IN COMMUNICATION NETWORKS WITH DYNAMIC CONTROL

(75) Inventors: Han C. Wen, San Jose, CA (US); Ian Adam, San Mateo, CA (US); Minh Duong-van, Menlo Park, CA (US); Tomas J. Pavel, San Jose, CA (US); Mark Crane, Reno, NV (US)

(73) Assignee: Network Physics, Inc., Menlo Park, CA (US)

( * ) Notice: Subject to any disclaimer, the term of this patent is extended or adjusted under 35 U.S.C. 154(b) by 776 days.

(21) Appl. No.: 09/846,452

(22) Filed: Apr. 30, 2001

(65) Prior Publication Data

US 2003/0193893 A1 Oct. 16, 2003

Related U.S. Application Data

(63) Continuation-in-part of application No. 09/539,434, filed on Mar. 30, 2000, now Pat. No. 6,674,717.

(51) Int. Cl.
*H04L 12/56* (2006.01)
(52) U.S. Cl. .................... 370/230.1; 370/231; 370/235
(58) Field of Classification Search ................ 370/229, 370/230, 230.1, 231, 232–235, 252, 253, 370/400, 401; 709/223, 224, 225, 229, 227, 709/228, 232
See application file for complete search history.

(56) References Cited

U.S. PATENT DOCUMENTS 5,367,523 A 11/1994 Chang et al.
5,400,329 A * 3/1995 Tokura et al. .............. 370/232

(Continued)

FOREIGN PATENT DOCUMENTS

EP 0817433 1/1998

(Continued)

OTHER PUBLICATIONS

John Nagle, "On Packet Switches with Infinite Storage," Network Group, Internet Engineering Task Force, RFC 970 (1985).

(Continued)

*Primary Examiner*—Wing Chan
*Assistant Examiner*—Duc Duong
(74) *Attorney, Agent, or Firm*—Blakely, Sokoloff, Taylor & Zafman LLP

(57) ABSTRACT

Predictions of congestion conditions for a traffic stream in a communication network are applied to modify an initial congestion window size for the traffic stream; and dynamic bandwidth control is thereafter applied to the traffic stream. This dynamic bandwidth control may include modulating inter-packet bandwidths of the traffic stream according to a capacity of a bottleneck in a communication path through which the traffic stream passes in the communication network. The predictions of congestion conditions may be based on monitoring packet losses and/or round trip times within the communication network for a selected period of time. The monitoring may be performed on at least one of a traffic stream-by traffic stream basis, a connection-by-connection basis, a link-by-link basis, or a destination-by-destination basis.

23 Claims, 3 Drawing Sheets

U.S. PATENT DOCUMENTS

| | | |
|---|---|---|
| 5,426,640 A | 6/1995 | Hiuchyj et al. |
| 5,439,483 A | 8/1995 | Duong-Van |
| 5,583,792 A | 12/1996 | Li et al. |
| 5,646,943 A | 7/1997 | Elwalid |
| 5,751,969 A * | 5/1998 | Kapoor ............... 709/235 |
| 5,930,364 A | 7/1999 | Kim |
| 5,995,488 A | 11/1999 | Kalkunte et al. |
| 6,014,694 A | 1/2000 | Aharoni et al. |
| 6,046,988 A | 4/2000 | Schenkel et al. |
| 6,075,770 A | 6/2000 | Chang et al. |
| 6,201,791 B1 * | 3/2001 | Bournas ............... 370/234 |
| 6,219,713 B1 * | 4/2001 | Ruutu et al. ............ 709/235 |
| 6,249,530 B1 | 6/2001 | Blanco et al. |
| 6,477,143 B1 * | 11/2002 | Ginossar ............... 370/230 |
| 6,532,214 B1 | 3/2003 | Rumsewicz |
| 6,560,231 B1 | 5/2003 | Kawakami et al. |
| 6,584,111 B1 | 6/2003 | Aweya et al. |
| 6,600,721 B2 | 7/2003 | Edholm |
| 6,614,763 B1 | 9/2003 | Kikuchi et al. |
| 6,643,259 B1 * | 11/2003 | Borella et al. ............ 370/231 |
| 6,674,717 B1 | 1/2004 | Duong-Van et al. |
| 6,684,247 B1 | 1/2004 | Santos et al. |
| 6,757,255 B1 * | 6/2004 | Aoki et al. ............... 370/252 |
| 6,766,309 B1 | 7/2004 | Cheng et al. |
| 6,826,151 B1 | 11/2004 | Li et al. |
| 6,947,381 B2 | 9/2005 | Wen et al. |
| 6,990,071 B2 | 1/2006 | Adam et al. |
| 2001/0015956 A1 | 8/2001 | Ono |
| 2001/0032269 A1 | 10/2001 | Wilson |
| 2002/0099854 A1 | 7/2002 | Jorgensen |
| 2002/0118649 A1 | 8/2002 | Farley et al. |
| 2002/0118661 A1 | 8/2002 | Voce |
| 2002/0159386 A1 | 10/2002 | Grosdidier et al. |
| 2002/0169880 A1 | 11/2002 | Loguinov et al. |
| 2003/0193893 A1 | 10/2003 | Wen et al. |

FOREIGN PATENT DOCUMENTS

| | | |
|---|---|---|
| WO | WO-00/02356 | 1/2000 |
| WO | WO 01/76160 A1 | 10/2001 |

OTHER PUBLICATIONS

Van Jacobson and Michael J. Karels, "Congestion Avoidance and Control," Proceedings of SIGCOMM '88, ACM, Stanford, CA (Aug. 1988).

W. Richard Stevens, "TCP/IP Illustrated, vol. 1: The Protocols," Addison-Wesley Publishing Company, pp. iii-xiv and 275-322 (1994).

Gary R. Wright and W. Richard Stevens, "TCP/IP Illustrated, vol. 2: The Implementation," Addison-Wesley Publishing Company, pp. vi-xviii and 817-1005 (1995).

Lawrence S. Brakmo, et al., "TCP Vegas: New Techniques for Congestion Detection and Avoidance," Copyright 1994 ACM 0-89791-682-4-94/0008, SIGCOMM 94- Aug. 1994, London, England, UK, pp. 24-35 (Aug. 1994).

PCT Notification of Transmittal of The International Search Report or The Declaration for PCT Counterpart Application No. PCT/US00/41174 Containing International Search Report (Jun. 22, 2001).

PCT Written Opinion for PCT Counterpart Application No. PCT/US00/41174 dated Sep. 17, 2001, 4 pgs.

PCT Notification of Transmittal of The International Preliminary Examination Report for PCT Counterpart Application No. PCT/US00/41174 (Aug. 5, 2002).

Pippas, John B., et al., "Shaping Aggregate LAN Flows for Transmission over ABR Connections", *Communication Networks*, vol. 10, No. 1, Jan.-Feb. 1999., pp. 45-56.

Trinh, Nguyen C., et al., "Dynamic Resource Allocation for Self-similar Traffic in ATM Network", *The University of Electro-Communications*, XP-002169395. pp. 160-165.

* cited by examiner

METHOD FOR ACCELERATING TCP FLOWS IN COMMUNICATION NETWORKS WITH DYNAMIC CONTROL

RELATED APPLICATION

The present application is related to and hereby claims the priority benefit of and is a continuation-in-part of U.S. patent application Ser. No. 09/539,434, entitled "METHOD FOR REDUCING PACKET LOSS AND INCREASING INTERNET FLOW BY FEEDBACK CONTROL," filed Mar. 30, 2000 now U.S. Pat. No. 6,674,717 and assigned to the assignee of the present application.

FIELD OF THE INVENTION

The present invention relates to a scheme for reducing fetch time in a communication network, in part based on recognizing the presence or absence of congestion in the network.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity. In such situations, fetch time (i.e., the time required to download requested content) is increased.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

Very early in the development of the modern Internet, it was discovered that some control over the manner in which packets were injected into the network by the source was needed to help with the problem of dropped packets. Originally, the well-known transmission control protocol (TCP) allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

Even with the slow-start process, however, congestion occurs within packet switched networks. As indicated above, congestion leads to increased fetch times and so what is needed is an improved scheme for improving these fetch times.

SUMMARY OF THE INVENTION

In one embodiment, predictions of congestion conditions for a traffic stream in a communication network are applied to modify an initial congestion window size for the traffic stream; and dynamic bandwidth control is thereafter applied to the traffic stream. This dynamic bandwidth control may include modulating inter-packet bandwidths of the traffic stream according to a capacity of a bottleneck in a communication path through which the traffic stream passes in the communication network. The predictions of congestion conditions may be based on monitoring packet losses within the communication network. Alternatively, the predictions may be based on measurements of packet round trip times and/or throughput in the network. The monitoring may be performed on at least one of a traffic stream-by traffic stream basis, a connection-by-connection basis, a link-by-link basis, or a destination-by-destination basis. Further, the monitoring may performed for a period between 0 and 100 seconds, preferably between 30 and 100 seconds, more preferably between 50 and 100 seconds, and even more preferably between 60 and 100 seconds. In general, the time required for the monitoring may depend on network conditions and/or the prediction procedure used.

In a further embodiment, an initial congestion window for a traffic stream in a communication network is set according to predicted congestion conditions for that traffic stream; and the traffic stream is rate limited to an effective bandwidth associated with a potentially congested bottleneck in a communication path over which the traffic stream is transmitted. The rate limiting may include setting a minimum time spacing between packets within the traffic stream. The initial congestion window may be set up to an advertised window size of a client receiving the traffic stream (e.g., the initial window may be set between two packets and the advertised window size).

In some cases, the rate limiting may include setting the effective bandwidth equal to a maximum transfer rate allowed by the potentially congested bottleneck in the communication path. Alternatively, the rate limiting may be applied using a feedback control process to modulate inter-packet bandwidths in the traffic stream. Such a feedback control process may be applied at a control node upstream of the potentially congested bottleneck in the communication path.

The predicted congestion conditions are preferably based on monitoring packet losses or round trip times within the communication network, for example for a period between 0 and 100 seconds, preferably between 30 and 100 seconds, more preferably between 50 and 100 seconds, and even more preferably between 60 and 100 seconds.

In still another embodiment, a communication network includes one or more communication paths between one or more content sources and one or more clients, at least one of the communication paths includes a control node configured to set an initial congestion window for a traffic stream transmitted over the at least one communication path according to predicted congestion conditions for that traffic stream and to rate limit the traffic stream to an effective bandwidth associated with a potentially congested bottleneck in the at least one communication path over which the traffic stream is transmitted. The control node may be configured to rate limit the traffic stream by (1) setting a minimum time spacing between packets within the traffic stream, (2) setting the effective bandwidth equal to a maximum transfer rate allowed by the potentially congested bottleneck in the communication path, or (3) by applying a feedback control process to modulate inter-packet bandwidths in the traffic stream.

In some cases, the control node is upstream of the potentially congested bottleneck in the at least one communication path. The at least one communication path may be selected on the basis of prior packet losses thereon.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
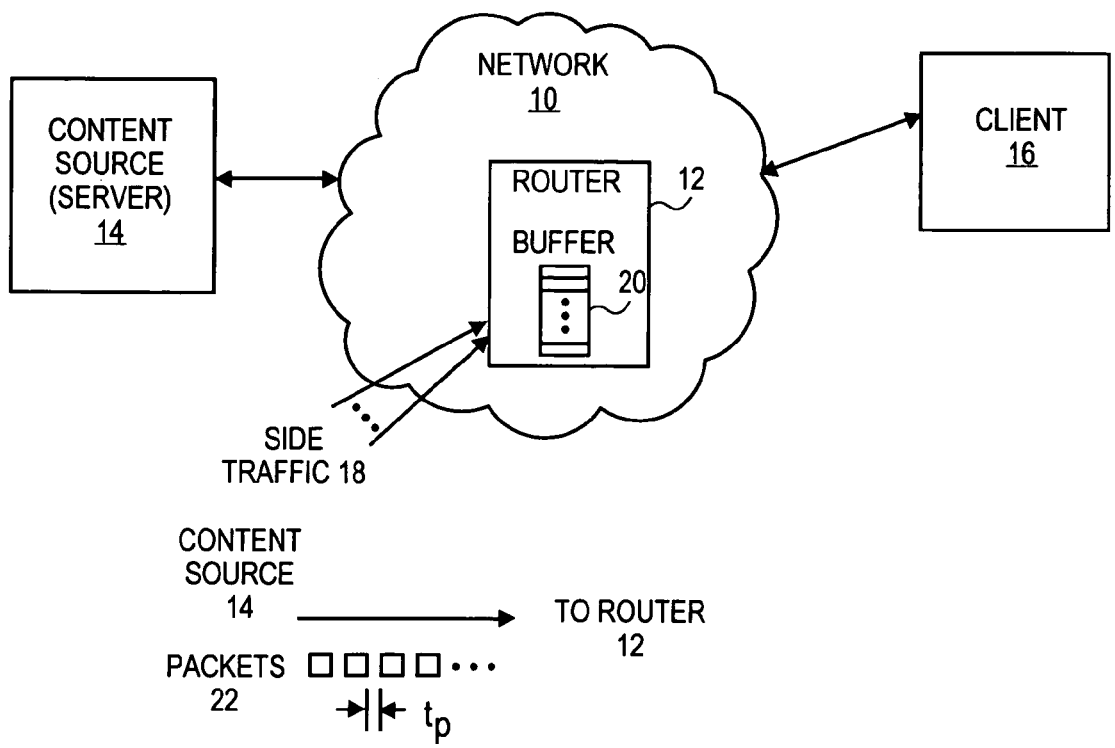
FIG. 1 shows an example of a packet switched network having one or more content sources.

A scheme for improving fetch time in a computer or communication network, such as the Internet or other packet switched network, is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

In contrast to these approaches of the past, in the above-cited patent application, application Ser. No. 09/539,434, which has issued as U.S Pat. No. 6,674,717, entitled "Method for Reducing Packet Loss and Increasing Internet Flow by Feedback Control". filed Mar. 30. 2000, which is hereby incorporated by reference in its entirety, the applicants introduced a new approach to congestion control that did exploit the chaotic nature of network traffic. Under the scheme described in the co-pending application, the end-to-end packet losses of one or more traffic streams transmitted across a congested network may be reduced by modulating the bandwidths (i.e., the inter-packet delay) of the corresponding traffic streams applied to the node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user). The control points can be either upstream or downstream of one or more congestion points along the network.

The modulation of the bandwidths of the traffic streams is governed by the following nonlinear differential equation, henceforth referred to as Equation 1:

$$\frac{dBW}{dt} = \left(\frac{1}{R}\right)[n \cdot (TP)^{C1} \cdot (BO)^{C2} - K \cdot (BW)^{C3}] \quad \text{(Equation 1)}$$

where the measured terms are defined as follows:
TP=throughput or bandwidth utilization of the communication link(s) under consideration;
BO=buffer occupancy level or queue time within the control unit on the communication links under consideration;

and the control terms are defined as follows:
BW=the control or modulated bandwidth of the communication link from the control unit to a downstream point or node;
R=relaxation time (which may be set empirically over a robust range depending upon network conditions—note that if R is set as too small a value, the present control scheme will be ineffective because insufficient time is allowed for the feedback control to operate over the network topology and if R is set at too long a period the control system will not be able to react promptly to fluctuations in the traffic flow);
n=linear coupling constant;
K=linear control constant; and
C1, C2 and C3=nonlinear feedback constants The nonlinear driving term in the time rate of change of the modulated bandwidth is the product of the throughput and buffer occupancy (TP·BO). Due to the nature of the approach to criticality of Equation 1, there are nonlinear feedback constants, C1, C2 and C3. The measured terms (TP and BO) may be determined according to a filtered measure such as an average or any moving average. The filtered measure of throughput (TP) or buffer occupancy level (BO) is taken over a sampling interval, which may be determined by a history of the measured quantity for the one or more traffic streams, buffering times of packets within the one or more traffic streams, or a combination of the history of the measured quantity for the one or more traffic streams and buffering times of packets within the one or more traffic streams.

By modulating the bandwidth of the traffic streams in the fashion described by Equation 1, feedback to the packet origin points (e.g., origin servers) congestion avoidance processes or algorithms is provided via acknowledgement delays from the ultimate client. That is, the time at which such acknowledgements are received at these servers is increased. This feedback indirectly (i.e., through existing congestion avoidance processes present in packet networks) control the rate at which the server transmits new packets into the network in such a way that overall packet loss is minimized.

Thus, this scheme introduces feedback control upstream or downstream of a congested node (such as a router or switch) to reduce packet loss and thereby smooth traffic flow and provide for increased throughput through that node (and even other downstream nodes). The feedback may be applied using a separate control node upstream or downstream of the congested node, or the feedback mechanisms may be integrated into existing network nodes. The feedback may be applied at frequencies (i.e., time intervals) that depend on the characteristics of the network traffic media (e.g., the bandwidth of the communication links). By applying such feedback control, the packet loss across multiple congested nodes are reduced, resulting in higher network throughput. Not only is throughput improved for the node immediately downstream of the point of feedback control, it may also be improved for subsequent downstream nodes.

The feedback control technique described by Equation 1 was developed for conditions of highly congested traffic. Through further experiment and observation, the present applicants have learned that in the real world, only a fraction of the total Internet traffic is highly congested. The majority of Internet traffic is uncongested (meaning that there is little or no packet loss in such traffic streams). The challenge then is to develop control techniques that can improve fetch time for the uncongested traffic that makes up the majority of Internet traffic.

Others have attempted to address this challenge by modifying existing processes. For example, persistent hypertext transfer protocol (http), which is a feature of http version 1.1 (supported by many existing Web browsers), provides for support of persistent connections. This means that once a browser connects to a Web server, it can receive multiple files through the same connection. By supporting multiple connections it is hoped overall performance (e.g., fetch time) is improved. Another proposal is to adjust the initial window for a slow start connection by increasing it to something greater than one packet. For example, a connection state could be remembered so that if the connection were opened in the future, a previous window size could be used as an initial window size.

These proposals attempt to allow for improved fetch time, but do not include any control mechanisms to ensure that in doing so, congestion which actually increases fetch time is not introduced. In contrast, the present scheme for improving fetch time does make use of a control process (i.e., in one embodiment it is the feedback control process described above and in the co-pending application in detail) to ensure that congestion is not introduced unintentionally. In effect, the control mechanism acts as a surge protector, to help limit the rate at which new packets are introduced to a network. In addition, the present scheme provides a mechanism for identifying traffic streams that are (or should be) uncongested (i.e., suffering little or no packet loss) and, therefore, which may benefit from the application of the present methods for reducing fetch time.

To better appreciate the methods of the present invention, consider the illustration shown in FIG. 1. Network 10 may be the Internet or another packet switched network. Within network 10 is a router 12, which is in a connection path between a content source (e.g., a server or other content provider such as a cache, etc.) 14 and a client (e.g., a Web browser) 16. Router 12 may be in other connection paths between content source 14 and other clients (not shown) or between other content sources and other clients (perhaps including client 16). These other connection paths are represented as side traffic 18. Packets from this side traffic as well as from content source 14 are stored temporarily in one or more buffers 20 at router 12.

If a new connection is opened between client 16 and content source 14, and one of the non-controlled methods of improving fetch time are in place, content source 14 may attempt to deliver packets 22 at a very fast rate. That is, the inter-packet delay time "$t_p$" will be small, typically because content source 14 will be provided with a relatively high bandwidth connection to network 10. This may have the effect of filling and even overflowing buffer 20 at router 12, because of bandwidth constraints on the outgoing communication link(s) to client 16. The result will be packet loss (probably for traffic streams in the connection path between content source 14 and client 16 as well as in the side traffic connection paths).

Figure 2:
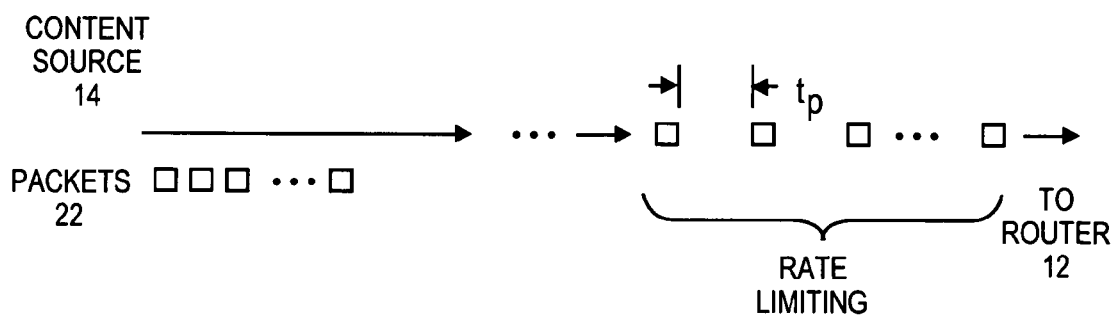
FIG. 2 shows an example of the application of the rate limiting techniques, which are an embodiment of the present invention, to the network shown in FIG. 1.

In contrast, the present scheme introduces a rate limiting effect. Referring to FIG. 2, in the present scheme the rate limiting is introduced in the connection path between the content source 14 and router 12, and in essence increases the inter-packet delay time, $t_p$, so that the router 12 can cope with the bandwidth constraints of outgoing communication links. By rate limiting the input traffic stream (e.g., to closely match the capacity of outgoing communication links from router 12), the present invention introduces a control process that helps to avoid congestion and thereby improves overall fetch time.

Figure 3:
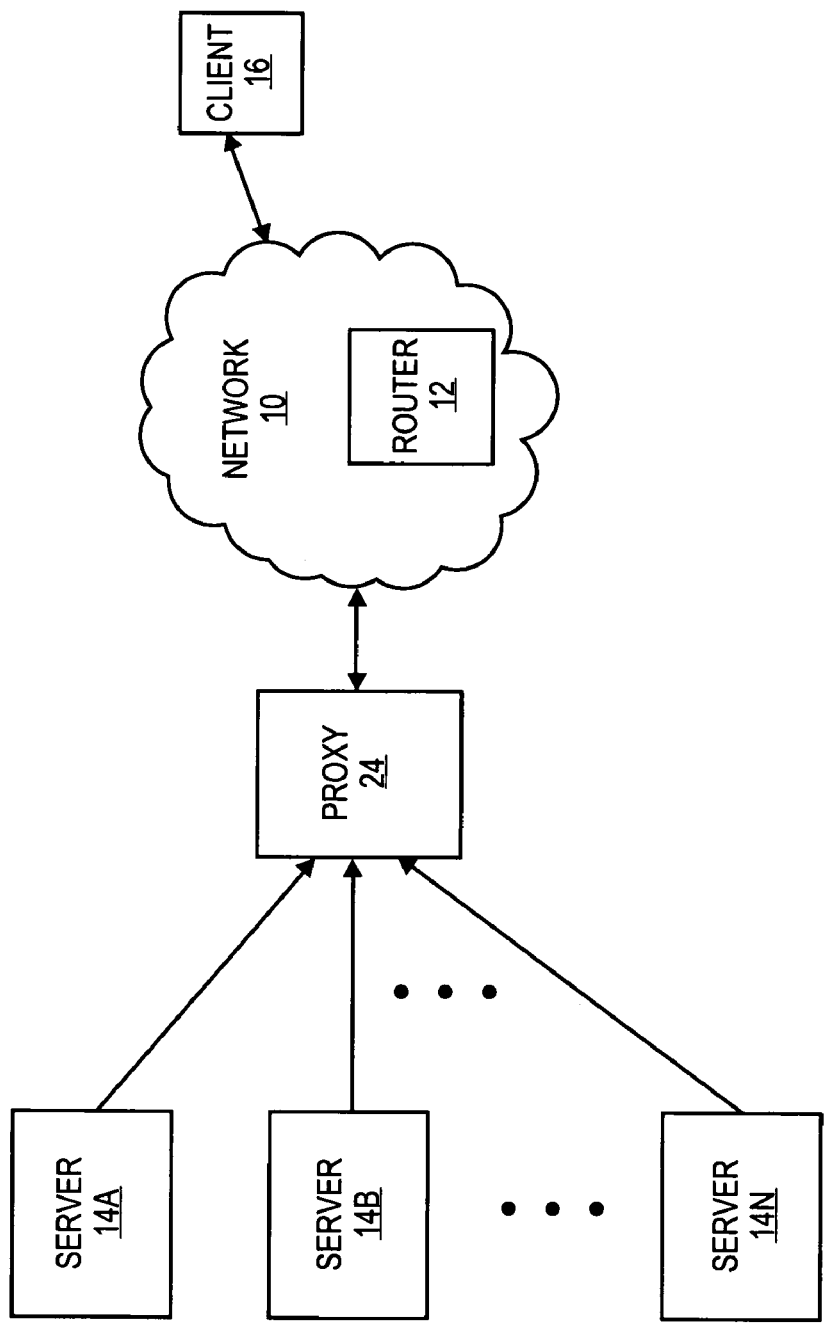
FIG. 3 shows a packet switched network having a proxy server configured in accordance with an embodiment of the present invention so as to rate limit traffic from a server farm when needed to avoid congestion.

The rate limiting function described above may be applied in any of a variety of ways. For example, a proxy could be introduced into the connection path between content source 14 and router 12. As shown in FIG. 3, such a proxy 24 may act as a front end for a large server farm 26 or other content source, in the connection path to router 12. In one embodiment, the rate limiting function is implemented using the feedback control technique described above, either in a proxy or similar device, or in one or more routers, switches, servers (or other content sources) or other network node(s).

The rate limiting function is preferably used in combination with another aspect of the present invention, namely the ability to determine which connections or traffic flows are likely to be uncongested. That is, through the use of the present methods, control nodes (such as proxy 24 in FIG. 3) are able to monitor network conditions and determine existing congestion conditions on a per connection, per traffic stream, per IP address or address range, or other basis. By knowing the existing congestion conditions, the control node can make decisions regarding an appropriate initial setting of a congestion window so as to best utilize the available bandwidth of a communication path, Then, from this initial setting, the congestion window can be increased (e.g., using the slow start algorithm), up to the advertised window size of the client. The rate limiting function will ensure that a minimum inter-packet spacing is maintained, thus permitting full use of the capacity of a downstream bottleneck. Alternatively, or in addition, the control node may set the initial congestion window to an optimum size for existing congestion conditions in the network and periodically adjust the connection window size based on updated congestion information. The rate limit feature may then act as a back up to ensure that congestion is avoided between periods of setting the congestion window size. In either case, by allowing for increased initial congestion window sizes on communication paths that are determined to be congestion free (or relatively congestion free), the present invention provides a mechanism for improving fetch time.

"To discriminate traffic flows (or connections, etc.) that are congested from those that are uncongested (or relatively uncongested), the control node monitors packet loss for the traffic stream (or connection, etc.) of interest, If after a designated time period (say between 0 and 100 seconds, preferably between 30 and 100 seconds, more preferably between 50 and 100 seconds, and even more preferably between 60 and 100 seconds) no packet losses have been noted for that traffic flow (connection, etc.), the control node can declare the subject traffic flow (connection, etc.) to be uncongested. This type of monitoring (and the subsequent control) can be provided on a stream-by-stream, connection-by-connection, link-by-link, destination-by-destination or other basis. Alternatively, predictions of congestion conditions may be based on results obtained by monitoring packet round trip times in the network. A complete description of such a process is provided in co-pending and commonly owned U.S. patent application Ser. No. 09/854,321, entitled "Method for Determining Network Congestion and Link Capacities", filed May 11, 2001, now U.S. Pat. No. 7,248, 564 B1, which is incorporated herein by reference. Briefly, it has been found that there is an intimate relationship between packet loss and packet round trip time in a network such that measurements of this round trip time can be used to determine congestion conditions. Further methods of predicting such conditions are disclosed in commonly-owned U.S. Patent Application Ser. No. 09/846,450, entitled "Method for Dynamical Identification of Network Congestion Characteristics", filed Apr. 30, 2001, now U.S. Pat. No. 7,072,297 B2, which is also incorporated herein by reference."

In summary then, the response times or file download times (fetch times) for traffic streams transmitted across a TCP/IP or other packet switched network may be reduced by applying predictions of congestion conditions for each stream to modify the streams' initial TCP congestion avoidance behavior. To ensure that congestion is not induced by these modifications, dynamic control techniques (such as the feedback control scheme described by Equation 1) are concurrently applied to these streams. Unlike the autonomous congestion avoidance algorithm embodied in the TCP slow-start process, the present method introduces knowledge of existing congestion conditions in a network to the decision making process regarding the initial congestion window settings.

The present methods provide advantages over the conventional TCP congestion avoidance process, which is applied with the same "slow-start" behavior for each file transfer. Most streams, however, transfer multiple files along the same network route for a given client and server pair. No knowledge of the congestion conditions as experienced by prior file transfers along the same network route is used to influence the conventional "slow-start" behavior of the next file transfer. However, if a given network route is known to have no congestion; the "slow-start" ramp up is redundant. The response time for the file transfer is unnecessarily delayed by the conventional procedure, as the file is parceled by the server into several trains of packets, each waiting for acknowledgement packets from the client. Instead, in accordance with the present invention, for those network routes that have been determined to have little or no congestion, the initial congestion window size can be increased for file transfers along those routes. The initial congestion window size may be increased up to the client's advertised window size to minimize the number of round trip times required to complete the file transfers.

The potential of this increase in initial window size to induce congestion along the associated network route will be minimal in practical applications. Most clients' advertised windows are limited to 8-16 kB. In addition, most clients typically download files that have sizes from 4-20 kB, due to performance constraints imposed by the clients' physical bandwidths (28.8/56 kbps modems, 384/768 kbps DSL connections, etc.). Furthermore, the limitations on clients' physical bandwidths also limits the load than any one client can impose for a given network route. All of these constraints limit the number of packets any one client can contribute to a potentially congested router link.

Nevertheless, to ensure that this modification to the TCP initial congestion avoidance behavior does not itself induce congestion, dynamic control techniques, such as those discussed above, may be applied to this subset of traffic. For example, a control technique that ensures minimal latency impact and no induced packet loss is that of rate-limiting each stream to the effective bandwidth associated with the potentially congested bottleneck. This effective bandwidth may be determined by using the feedback control process described in the co-pending patent application. This rate limit imposes a minimum time spacing between packets to ensure that only one packet can ever enter the queue of the potentially congested bottleneck at a time, before another waiting packet gets transmitted out of the queue. Because this is also the maximum transfer rate allowed by potentially congested bottleneck, this rate limit introduces insignificant latency to the file transfer.

A more aggressive technique for dynamic control of this "accelerated" TCP traffic on uncongested network routes, would consist of only applying the control on those streams that subsequently encounter packet loss. This minimizes the scaling problem of determining and keeping track of rate limiting bandwidths for all clients to a smaller subset.

Applying these techniques to streams transferred across uncongested network routes depends upon the ability to accurately identify congested streams. An empirical analysis of real traffic data from major Web portal sites indicates that there are two major factors in determining congested streams. The first is the inherent congestion on a particular network route that is driven by external factors such as cross traffic. An analysis of these network routes demonstrates that this congestion varies on fairly long timescales, such as tens of minutes to several hours. The second is the traffic generated by the stream itself that is traversing this congested network route. This traffic can vary on much faster and broader timescales such as tens of seconds to several hours and varies greatly from stream to stream.

Figure 4A:
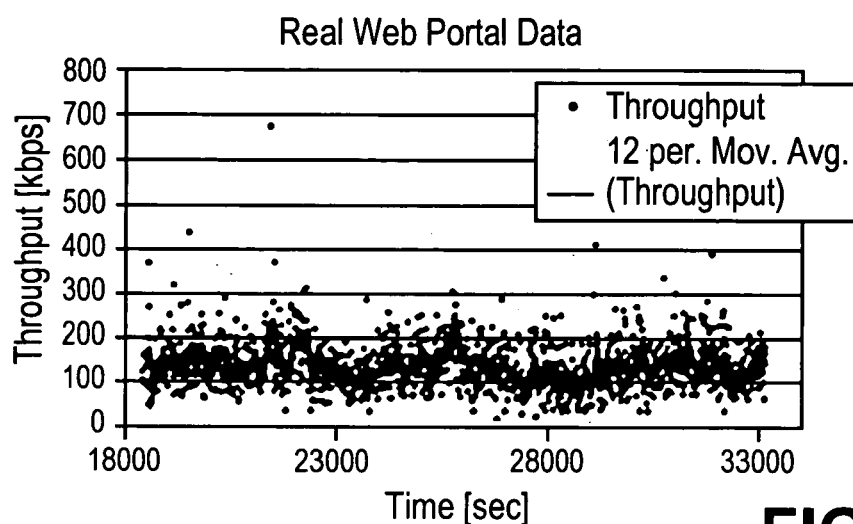
FIG. 4A is a plot illustrating variations in throughput as a function of time for real Web portal data.
Figure 4B:
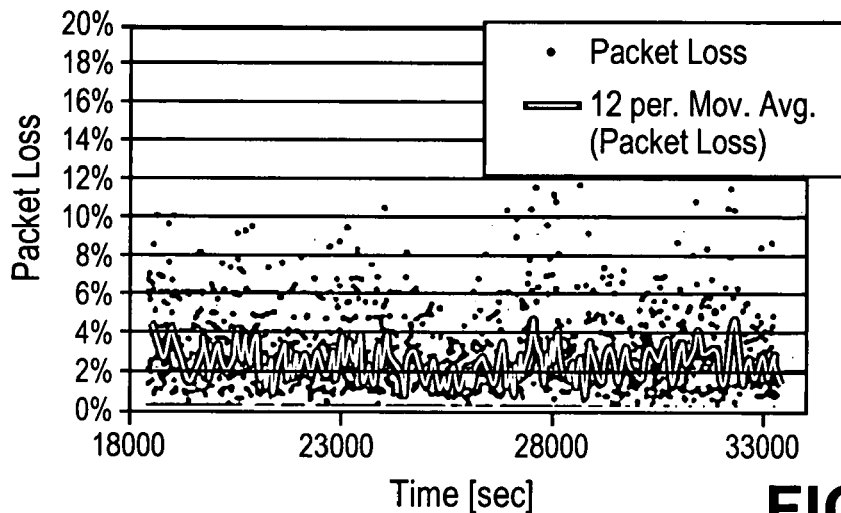
FIG. 4B is a plot illustrating variations in packet loss as a function of time for real Web portal data.
Figure 4C:
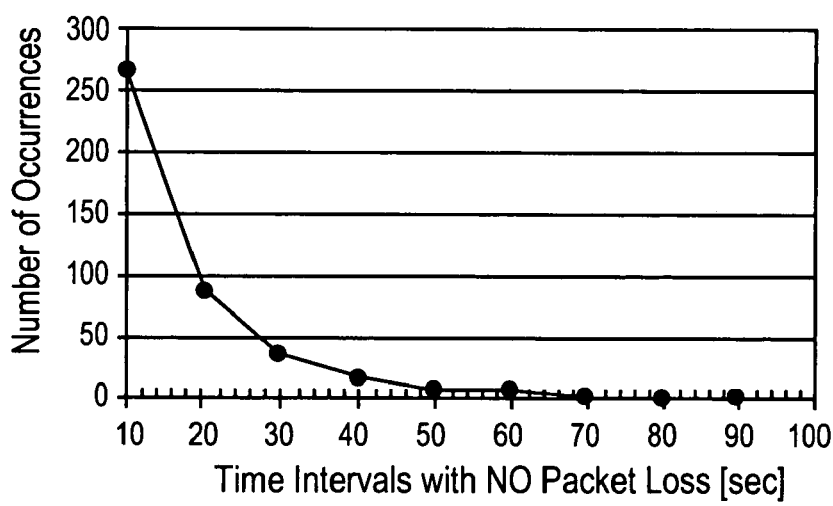
FIG. 4C is a plot indicating likelihoods of experiencing congestion as a function of observed periods of no packet loss.

An extensive analysis of real-time traffic data shows that congestion as measured by the monitored streams can be discriminated from periods of no congestion by looking at time intervals in which there is no packet loss. FIGS. 4A and 4B are plots of actual Web traffic, showing variations in throughput (FIG. 4A) and packet loss (FIG. 4B) as functions of time. As shown in FIG. 4C, as time intervals approaching 60-100 seconds are measured without significant packet loss, we can be reasonably certain that the subject traffic flow is uncongested. For large enough time intervals then, the probability that the absence of packet loss is due to statistics of the monitored stream is negligible. Those are periods where there is no congested for the associated network route. However, intervals where there is no packet loss due purely to the statistics of the monitored stream can occur in the tens of seconds. These are periods where the inherent congestion in the route may exist, but for the underlying packet loss rate, not enough packets from the monitored stream have been transferred along this route to make it statistically likely that one or more of those packets have been dropped.

With such a congestion identification scheme, monitored streams can be grouped according to common congestion characteristics. In the simplest case, the streams can be divided into two groups: those with congested routes and those without congested routes. For the uncongested group, the techniques described above in conjunction with the dynamic control processes can accelerate file transfers, thereby reducing response times without increasing congestion. For the congested group, the feedback control processes described in the co-pending patent application can be applied.

Thus a scheme for improving fetch time in a communication network has been described. The feedback control methodology described herein is merely one example of a control mechanism that can be used in accordance with the present teachings. Other control processes can be used in place of the feedback control mechanism. It should be remembered therefore, that although the foregoing description and accompanying figures discuss and illustrate specific embodiments, the broader scope of present invention should be measured only in terms of the claims that follow.

What is claimed is:

1. A method, comprising:
applying predictions of congestion conditions for a traffic stream in a communication network to increase an initial congestion window size for the traffic stream up to an advertised window size of a client receiving the traffic stream; and
applying dynamic bandwidth control to the traffic stream by modulating bandwidths of the traffic stream according to a capacity of a bottleneck in a communication path through which the traffic stream passes in the communication network, wherein the dynamic bandwidth control is concurrently applied to the traffic stream to ensure that congestion is not induced by applying predictions of congestion conditions to the traffic stream.

2. The method of claim 1 wherein the predictions of congestion conditions are based on one of: (1) monitoring packet losses within the communication network, or (2) monitoring packet round trip time in the communication network.

3. The method of claim 2 wherein the monitoring is performed on at least one of a traffic stream-by traffic stream basis, a connection-by-connection basis, a link-by-link basis, or a destination-by-destination basis.

4. The method of claim 3 wherein the monitoring is performed for a period between 0 and 100 seconds.

5. The method of claim 4 wherein the monitoring is performed for a period of time between 30 and 100 seconds.

6. The method of claim 4 wherein the monitoring is performed for a period of time between 50 and 100 seconds.

7. The method of claim 4 wherein the monitoring is performed for a period of time between 60 and 100 seconds.

8. A method comprising:
setting an initial congestion window for a traffic stream in a communication network according to predicted congestion conditions for that traffic stream, increased up to an advertised window size of a client receiving the traffic stream; and
rate limiting the traffic stream to an effective bandwidth associated with a potentially congested bottleneck in a communication path over which the traffic stream is transmitted, wherein rate limiting the traffic stream acts as a back up to ensure that congestion is avoided between periods of setting the congestion window size.

9. The method of claim 8 wherein the rate limiting comprises setting a minimum time spacing between packets within the traffic stream.

10. The method of claim 8 wherein the rate limiting comprises setting the effective bandwidth equal to a maximum transfer rate allowed by the potentially congested bottleneck in the communication path.

11. The method of claim 8 wherein the rate limiting is applied using a feedback control process to modulate bandwidths in the traffic stream.

12. The method of claim 11 wherein the feedback control process is applied at a control node upstream of the potentially congested bottleneck in the communication path.

13. The method of claim 8 wherein the predicted congestion conditions are based on one of: (1) monitoring packet losses within the communication network, or (2) monitoring packet round trip time items in the communication network.

14. The method of claim 13 wherein the monitoring is performed for a period between 0 and 100 seconds.

15. The method of claim 14 wherein the monitoring is performed for a period of time between 30 and 100 seconds.

16. The method of claim 14 wherein the monitoring is performed for a period of time between 50 and 100 seconds.

17. The method of claim 14 wherein the monitoring is performed for a period of time between 60 and 100 seconds.

18. A communication network comprising one or more communication paths between one or more content sources and one or more clients, at least one of the communication paths including a control node configured to set an initial congestion window for a traffic stream transmitted over the at least one communication path according to predicted congestion conditions for that traffic stream, increased up to an advertised window size of a client receiving the traffic stream and to rate limit the traffic stream to an effective bandwidth associated with a potentially congested bottleneck in the at least one communication path over which the traffic stream is transmitted, wherein rate limiting the traffic stream acts as a back up to ensure that congestion is avoided between periods of setting the congestion window size.

19. The network of claim 18 wherein the control node is configured to rate limit the traffic stream by setting a minimum time spacing between packets within the traffic stream.

20. The network of claim 18 wherein the control node is configured to rate limit the traffic stream by setting the effective bandwidth equal to a maximum transfer rate allowed by the potentially congested bottleneck in the communication path.

21. The network of claim 18 wherein the control node is configured to rate limit the traffic stream by applying a feedback control process to modulate bandwidths in the traffic stream.

22. The network of claim 21 wherein the control node is upstream of the potentially congested bottleneck in the at least one communication path.

23. The network of claim 18 wherein the at least one communication path is selected on the basis of prior packet losses thereon.

* * * * *